Sept. 9, 1958   H. J. WOOD   2,850,876
GAS TURBINE COMPRESSOR AND POWER TAKE-OFF DRIVE
Original Filed Aug. 9, 1948   3 Sheets-Sheet 1
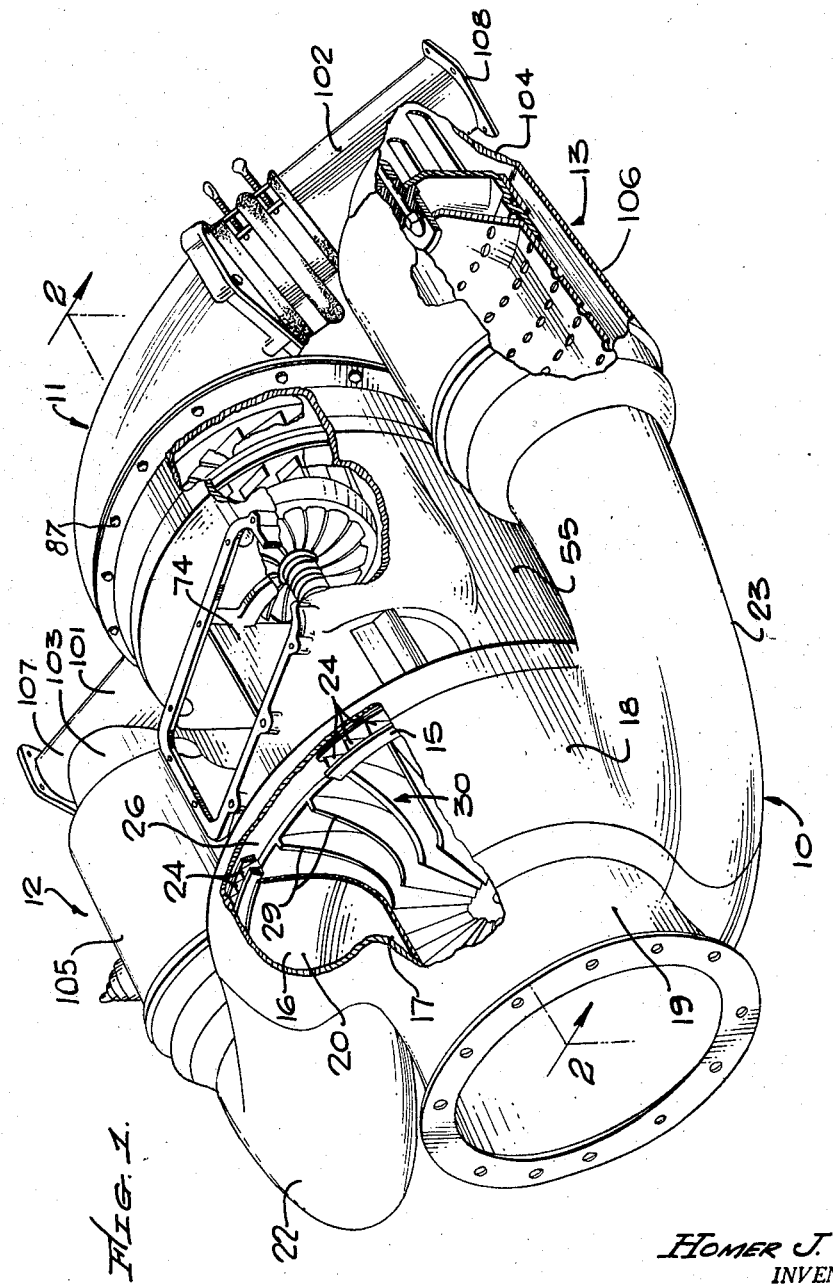
HOMER J. WOOD,
INVENTOR.
BY
ATTORNEY

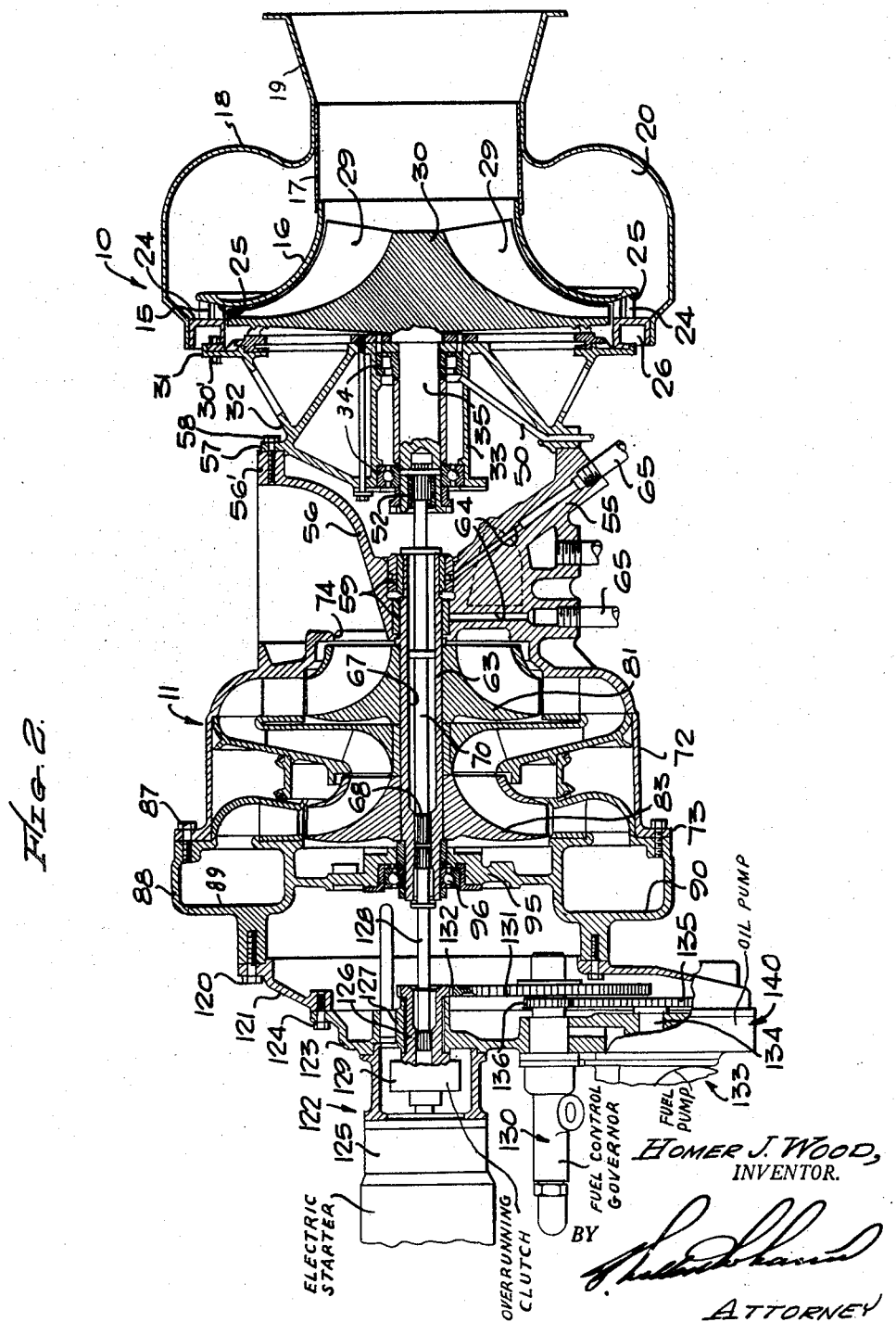

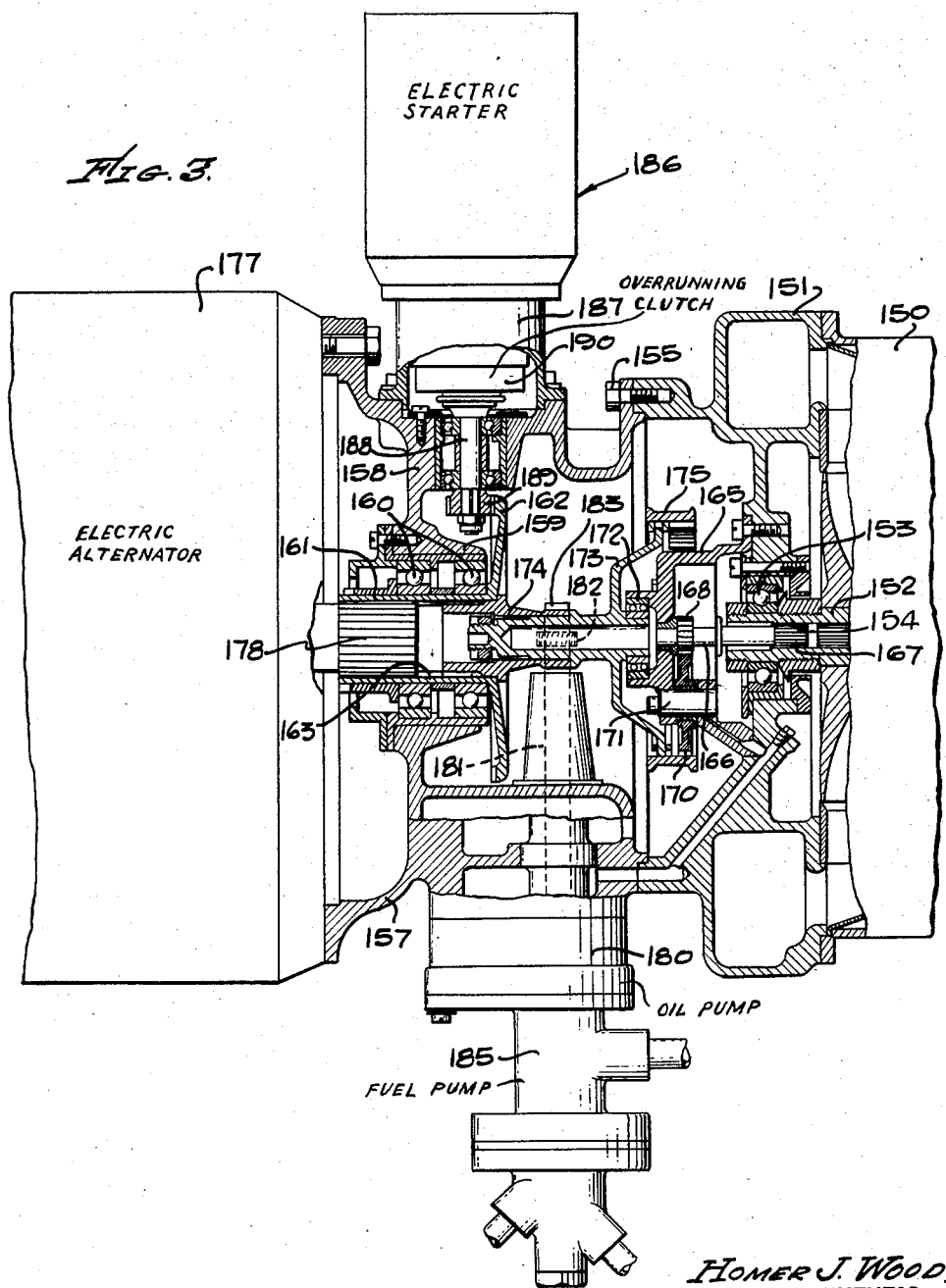

United States Patent Office 2,850,876
Patented Sept. 9, 1958

2,850,876

GAS TURBINE COMPRESSOR AND POWER TAKE-OFF DRIVE

Homer J. Wood, Sherman Oaks, Calif., assignor to The Garrett Corporation, Los Angeles, Calif., a corporation of California Original application August 6, 1948, Serial No. 42,984, now Patent No. 2,648,491, dated August 11, 1953. Divided and this application April 9, 1953, Serial No. 347,722

1 Claim. (Cl. 60—39.75)

This invention relates generally to power plants and, more particularly, to a hot gas turbine compressor unit especially adapted as a source of auxiliary power aboard an aircraft.

The present application is a division of my copending application, Serial No. 42,984, filed August 6, 1948, now Patent No. 2,648,491, issued August 11, 1953.

It is highly desirable in aircraft of the larger types that an auxiliary power means be provided for starting the engines, for operating electrical generators, cabin supercharging equipment and other accessories so that the full power developed by the aircraft engines can be utilized for propelling the airplane. It is also important that such an auxiliary power unit be very compact so that it occupies a minimum space, and light in weight so that the weight of the aircraft is not materially increased or its pay-load decreased to any appreciable degree.

It is an important object of this invention to provide a power unit which meets the above-noted requirements and which is highly efficient in operation, delivering maximum power per unit of weight.

Another object of the invention is to provide a power unit of the hot gas turbine compressor type which is adapted to supply power either through a mechanical drive or in the nature of compressed air for directly or indirectly operating various mechanisms and controls, such as those employed in aircraft.

Another object is to provide a turbo-compressor in which the compressor may supply air to the airplane pneumatic system as well as to the hot gas turbine, the air supplied to the combustion chambers for the turbine being divided at the entrances or inlet ports of the combustion chambers. In accordance with the invention, at least one combustion chamber is provided, in which fuel is burned to heat the "power" air, this air then being expanded through the hot gas turbine.

Another object is to provide a power unit, of the class referred to, in which the individual components are designed such that the unit as a whole is small, compact and light in weight and thus particularly adapted for use in aircraft.

Another object is to provide a turbo-compressor power unit in which slender torsion bars or shafts are employed for transmitting power from the turbine to the compressor so that slight misalignment between major components can occur without presenting mechanical difficulties. By this means, exact alignment of the components is unnecessary and precision fitting of the various housings composing the unit is avoided.

Another object is to provide a power unit of the type indicated in which a two-stage compressor having backwardly curved impeller vanes and a double-volute discharge opening is employed. By this construction, wide variation in air flow rate, without pulsation hazard or serious efficiency loss is effected, the two stages being required to provide sufficient air pressure due to the backward curved impeller vanes, and the double-volute discharge producing better aerodynamic balance, neater unit configuration and simplified scroll geometry.

Another object is to provide a power unit of the class designated in which the compressor impellers are fully shrouded so as to effectively reduce end thrust loads and obtain higher efficiencies.

Further objects of the invention will appear from the following detailed description and from the drawings, which are intended for the purpose of illustration only, and in which:

Fig. 1 is a perspective view of a turbine compressor power unit embodying the present invention;

Fig. 2 is a longitudinal vertical sectional view, taken on line 2—2 of Fig. 1; and Fig. 3 is a longitudinal sectional view through the rearward end of a turbo-compressor power plant, showing a modified type of power take-off means in the form of a mechanical transmission by which an electrical generator is driven.

Referring to the drawings in detail, the present improved power plant shown therein is of the hot gas turbine compressor type and includes a hot gas turbine, indicated generally by the reference character 10, a two-stage compressor 11 and a pair of combustion chambers 12 and 13. The turbine 10 and compressor 11 are disposed in axial alignment and each comprises a separate component or assembly adapted to be readily interchanged.

The hot gas turbine 10 includes a nozzle ring 15 which has a stator shroud 16 secured thereto, the shroud being curved inwardly and terminating in a tubular forward end 17, the inner side of which provides the exhaust tube of the turbine. An enclosure 18 surrounds and is affixed to the tube 17 and has its forward flared end 19 projecting beyond the end of the tube to provide an axial extension thereof. The enclosure 18 extends radially outward from the tube 17 and then rearwardly to be secured to the nozzle annulus 15. An annular hot gas inlet passage 20 is thus provided between the shroud 16 and the enclosure 18 into which hot gas is introduced by way of curved tubes 22 and 23 leading from the combustion chambers 12 and 13, respectively. The nozzle annulus 15 is channel shaped to form an annular air space 26 in its rearward face, and is provided on its forward face with a series of inclined vanes 24 around its periphery, the spaces 25 between the vanes constituting nozzles through which the hot gas is directed against the blades 29 of a turbine wheel 30.

Secured to a flange of the nozzle annulus 15 by means of bolts 30' is the peripheral portion 31 of a bearing housing 32 which has an axial sleeve-like portion 33. Within the sleeve portion 33, at the ends thereof, are anti-friction bearings 34 which rotatably support the shaft 35 of the turbine wheel 30, it being noted that the shaft 35 is formed integral with the wheel so as to obtain maximum strength and close balance.

The bearings 34 for the turbine wheel shaft 35 are supplied with lubricant forced through a tube 50 connected to a suitable pump (not shown). Fast within an axial bore at the inner end of the turbine shaft 35 is a sleeve 52 having a splined inner surface adapted for driving connection with the compressor 11.

The compressor unit 11, which is made as a subassembly of the power plant, is of the two-stage type. The unit 11 includes a compressor housing 55 which has a forward funnel-shaped end 56 provided with a peripheral flange 56' which is adapted to abut the side of a similar flange 57 of the turbine bearing housing 32 and to be secured thereagainst by bolts 58. The end 56 of the compressor housing 55 has an axial bore in which bearing bushings 59 are held, these bushings providing bearings in which the forward end of a tubular compressor shaft 63 is adapted to rotate. Lubricant is supplied to these relatively rotating parts through passages 64 and lines 65 connected to the oil pump previously referred to. The compressor shaft 63 has a bore 67 which is reduced in diameter as indicated at 68, this reduced portion having splines on its interior. A quill shaft 70, which extends coaxially through the shaft 63, has splined ends which engage in the splined portions 68 and 52, respectively. It is thus seen that when the turbine wheel is driven, torque is imparted through the quill shaft 70 to rotate the shaft 63 and compressor impellers 81 and 83 carried thereby. The quill shaft 70 is adapted to flex and to twist somewhat so that it provides a substantially resilient driving connection in the form of a torsion shaft between the turbine and the compressor units. Due to the flexibility of the quill shaft 70, substantially vibrationless performance is achieved. Moreover, the quill shaft makes for ease of assembly of the components of the power unit since it compensates for slight axial misalignment of the components.

Secured to the peripheral flange 73 of the compressor housing 55, 72 by bolts 87 is an annular member 88 which has walls defining a pair of volute discharge passages 89 and 90 which communicate with volute discharge ducts extending laterally outward from the compressor unit 11. As shown in Fig. 2, the member 88 has a central portion 95 which is provided with an axial bore in which suitable antifriction bearing means, indicated at 96, is disposed. The bearing means 96 rotatably supports the rearward end of the tubular compressor shaft 63 and takes the axial thrust of the shaft. The bearing 96 is preferably lubricated by a pressure system (not shown).

The compressor 11 has an air inlet connection opening 74 and double volute discharge ducts which are coupled with elbow shaped air ducts 101 and 102, respectively. The ducts 101 and 102 have extension portions 103 and 104, and forwardly extending portions or shells 105 and 106 which are arranged substantially parallel to the axis of the power unit and which constitute the outer housings or shells of the respective combustion chambers 12 and 13. The portions 103 and 104 of the elbow shaped ducts 101 and 102 are extended laterally in air discharge tubes or branches 107 and 108 having flanged ends by which suitable ducts (not shown) can be connected. The tubes 107 and 108 constitute bleed-offs through which air compressed within the compressor unit 11 can flow to the airplane pneumatic power system.

The ambient air, upon entering the inlet opening 74 of the compressor unit 11, is compressed by the compressor and forced laterally through the volute discharge ducts 101 and 102 and into the combustion chambers 12 and 13 where the heat content or enthalpy of the compressed air is increased by the combustion of fuel therein, this being accomplished with as near an approach as is possible to a constant pressure desideratum. This higher energy level air is then directed by the curved inlet ducts 22 and 23 and the enclosure 18 through the nozzles to rotate the turbine wheel 30, the air then exhausting through the discharge tube 19.

Attached to the rearward end of the scroll member 88 by bolts 120 is a frame 121 (Fig. 2). Detachably connected to the frame 121 is an accessory unit, indicated generally by the reference character 122. The accessory unit 122 includes a support member or casing 123 which is secured to the frame 121 by bolts 124 and on which the several accessories are mounted. One of these accessories is an electrically operated starter 125 which has a tubular shaft extension 126 rotatable in a bearing boss 127 of the support member 123. The reference numeral 129 (Fig. 2) designates an overrunning clutch which functions to disconnect the starter shaft from the turbine when the turbine speed becomes greater than the starter speed or when the starter is deenergized. In either event the starter remains de-clutched until such time as both starter and turbine come to rest. The shaft extension 126 has a splined bore for receiving the rearward splined end of a relatively short, flexible starter shaft 128. The forward end of the shaft 128 is similarly splined and received in the splined portion 68 of the tubular compressor shaft 63. It is thus seen that when the starter 125 is energized, torque is transmitted through the shaft 128 to the compressor shaft 63 to rotate the compressor impellers so as to initially start the power unit. After the turbine wheel 30 has started to rotate in response to the passage of hot gas therethrough and the compressor impellers are driven from the turbine unit, the starter motor is deenergized.

A fuel control device 130, preferably of the governor type, is also mounted on the support member 123 and has a gear 131 which is driven from a gear 132 on the tubular shaft extension 126. Also mounted on the support member 123 below the fuel control device 130 is a fuel pump 133 having a shaft 134 and a gear 135 on the shaft which meshes with a smaller gear 136 rotatable with the gear 131. An oil pump 140 is attached to the support member 123 below the fuel pump 133 and driven from the gear 135. It is thus seen that the several accessories are driven continuously by and during the rotation of the shafts 128 and 70. Since the accessories mentioned above may be of any suitable types, they are not herein shown or described in detail.

Since the power absorbed by the compressor is a function of air flow rate, the amount of fuel burned in the combustion chambers is determined by air flow rate. Control is accomplished by maintaining substantially constant turbine speed through the agency of the governor. Thus, an increase in supply air flow tends to absorb more power, the power unit tends to reduce in speed and the governor increases the fuel supplied in order to compensate for this reduction in speed.

It will be observed from the foregoing that the present invention provides a hot gas turbine compressor power unit which is particularly adapted for supplying compressed air for use in various pneumatically operated controls and mechanisms. However, it is within the concept of this invention to provide a direct mechanical power take-off in the nature of a gear box, or the like, connected to be driven from the compressor shaft, such an embodiment of the invention being described hereinafter.

It is also to be noted that the mechanical design of the power unit is such that major components are made as separate assemblies capable of being readily interchanged. For example, the hot gas turbine has an independent bearing mounting and may be readily connected to or detached from the compressor as a complete assembly. Similarly, the compressor and accessory case are made as separate units adapted to be connected to and disassembled from the power unit. The power plant is particularly adapted for use as an auxiliary power supply aboard an aircraft since it is extremely compact, light in weight and highly efficient in operation.

The invention has thus far been described as embodied in a turbo-compressor unit in which a portion of the air compressed by the compressor unit is discharged from the unit and utilized as a source of pneumatic power for operating various aircraft controls or air-driven mechanism. It is within the concept of the invention, however, to provide a turbo-compressor power unit in which the compressor shaft is utilized as the source of direct power for operating an aircraft generator or other equipment. Such a modified version of the power unit is disclosed in Fig. 3 and constructed in the manner next described.

In the structure illustrated in Fig. 3, the turbine unit and the air compressor unit may be of substantially the same construction as previously described and therefore are not shown in detail. In this alternative embodiment, in some cases the compressed air is not bled off for the purpose of providing pneumatic power and for this reason the air ducts 101 and 102, as shown in Fig. 1, have no branch lines 107 and 108 but rather may feed directly into the combustion chambers. Because of this fact, it will be apparent that a compressor unit of smaller capacity or a turbine unit of larger size may be desirable.

In Fig. 3, the reference character 150 designates the rear portion of the compressor housing and 151 represents the scroll member or discharge member which is bolted to the end of the compressor housing and which is substantially the same as the member 88 described in connection with the embodiment illustrated in Fig. 2. The rearward end of the tubular compressor shaft 152 is rotatable in an anti-friction bearing 153, disposed axially within the air discharge member 151, and has an internally splined portion 154.

Secured to the rearward end of the air discharge member 151, by bolts 155, is an annular transmission housing 157 which has a rear end plate 158 provided with a hub 159 having a bore in which anti-friction bearings 160 are retained by suitable means clearly shown in the drawing. Rotatable in the bearings 160 is the sleeve-like hub 161 of a relatively large face gear 162 having a splined bore 163 disposed in axial alignment with the axis of the compressor shaft 152.

Fastened to the rearward face of the air discharge member 151 is a cup-shaped support member 165 which has a bore in which the rearward end of a relatively short shaft 166 is rotatable, the forward splined end 167 of this shaft engaging in the splined portion 154 of the compressor shaft 152 so as to be rotated thereby, the shaft 166 being provided with a gear 168. A plurality of larger gears, one of which is shown at 170 as rotatable on a pin 171 extending between the sides of the lower forked end of the support member 165, meshes with the gear 168 to be driven thereby. Rotatable within an anti-friction bearing 172, mounted in the support member 165, is one end of a hub member 173, the other end of which is secured within the hub portion 161 of the ring gear 162. The hub member 173 carries a ring 175 having internal gear teeth meshing with the teeth of the gear 170. By this arrangement of gears, when the compressor unit is in operation, power is transmitted from the shaft 152 through the gear 168, gear 170 and ring gear 175 to rotate the hub member 173 and the ring gear 162 connected thereto.

The power derived from the shaft 152 can be utilized for driving machines or equipment of various types. As an example, the power transmission mechanism illustrated in Fig. 3 may be advantageously employed for driving an electrical alternator, such as indicated at 177. In this case, the shaft 178 of the alternator 177 has a splined end which engages in the spined bore of the gear hub 161 so as to be rotated thereby. It is thus seen that when the compressor shaft 152 is rotated, the alternator 177 is operated thereby. As will be apparent, it is necessary that the alternator 177 be operated at a constant speed and this is attained by operating the compressor at a constant predetermined speed.

The power transmission described above also operates accessories for the turbo-compressor power plant, one of these being an oil pump 180 which is bolted to the bottom of the transmission housing 157. The pump 180 has a shaft 181 provided with a gear 182 which meshes with a similar gear 183 formed integral with the hub of the ring gear 162. It is thus seen that during operation of the air-compressor the oil pump 180 is driven thereby. The shaft 181 is connected to operate a fuel pump 185 attached to the lower end of the oil pump 180, this connection and the pumps being of any suitable construction and therefore not disclosed in detail.

An electrical starter 186 has its casing 187 secured to the annular wall of the transmission housing 157 and has a shaft 188 provided with a gear 189 disposed within the housing and meshing with the ring gear 162. To start the turbo-compressor power plant, the starter 186 is energized to cause its gear 189 to rotate the ring gear 162, hub member 173, gears 170 and 168, shaft 166 and compressor shaft 152. After the turbo-compressor power unit attains the speed necessary for operation, the starter 186 is automatically or manually deenergized. An overrunning clutch 190 (Fig. 3) is employed for the purpose of disconnecting the starter shaft 188 from the turbine, this clutch being similar to and functioning in the same manner as the clutch 129, discussed previously.

I claim as my invention:

In a gas turbine power plant: an air compressor including an impeller mounted between the ends of a hollow shaft; bearings supporting said shaft at its respective ends for rotation; a hot gas turbine including a turbine wheel mounted on a shaft axially aligned with said hollow shaft, and having a combustion chamber connected to receive combustion air from said compressor; bearings independently supporting the turbine shaft for rotation; a flexible torsion driving shaft connected at one end to said turbine shaft, said torsion driving shaft extending into said hollow shaft and having its other end connected to the end of the hollow shaft remotely positioned with respect to said turbine shaft; and a power take-off torsion shaft having a driving connection with the latter end of said hollow shaft, said power take-off torsion shaft being positioned on the opposite side of said compressor from the gas turbine; whereby the compressor load and take-off load are transmitted to the turbine shaft through said torsion driving shaft.

References Cited in the file of this patent

UNITED STATES PATENTS

| | | |
|---|---|---|
| 1,998,778 | Gregg | Apr. 23, 1935 |
| 2,180,168 | Puffer | Nov. 14, 1939 |
| 2,193,114 | Seippel | Mar. 12, 1940 |
| 2,263,705 | Seippel | Nov. 25, 1941 |
| 2,303,381 | New | Dec. 1, 1942 |
| 2,358,301 | Branns | Sept. 19, 1944 |
| 2,362,714 | Nettel | Nov. 14, 1944 |
| 2,390,959 | Pfenninger | Dec. 11, 1945 |
| 2,432,359 | Streid | Dec. 9, 1947 |
| 2,452,298 | Goode | Oct. 26, 1948 |
| 2,477,683 | Birmann | Aug. 2, 1949 |
| 2,516,066 | McLeod et al. | July 18, 1950 |

FOREIGN PATENTS

| | | |
|---|---|---|
| 540,453 | Great Britain | Oct. 17, 1941 |